(12) United States Patent
    Cahill

(10) Patent No.: US 6,880,208 B2
(45) Date of Patent: Apr. 19, 2005

(54) PACKAGING CONNECTOR

(76) Inventor: James Cahill, P.O. Box 669, Cardiff, CA (US) 92007

( * ) Notice: Subject to any disclaimer, the term of this patent is extended or adjusted under 35 U.S.C. 154(b) by 315 days.

(21) Appl. No.: 09/832,396

(22) Filed: Apr. 10, 2001

(65) Prior Publication Data

US 2001/0016970 A1 Aug. 30, 2001

Related U.S. Application Data

(63) Continuation-in-part of application No. 09/046,112, filed on Mar. 20, 1998, now Pat. No. 6,212,741, which is a continuation-in-part of application No. 08/536,400, filed on Sep. 29, 1995, now abandoned.

(51) Int. Cl.[7] .............................................. A44B 21/00
(52) U.S. Cl. .......................... 24/298; 24/304; 206/521; 206/804
(58) Field of Search .................. 24/298, 304, 300–302, 24/DIG. 11; 206/584, 521, 804, 459.5, 460; 53/472, 474; 40/668, 312, 299.01; 428/40.1, 42.1, 42.2

(56) References Cited

U.S. PATENT DOCUMENTS

| | | | | |
|---|---|---|---|---|
| 681,934 A | * | 9/1901 | Smith | 63/20 |
| 1,910,597 A | * | 5/1933 | Elliott | 242/404.3 |
| 2,248,338 A | * | 7/1941 | Castleman | 206/38 |
| 3,217,955 A | * | 11/1965 | Tinkey | 225/47 |
| 3,746,285 A | * | 7/1973 | Mango | 244/98 |
| 3,964,427 A | * | 6/1976 | Murphy | 116/210 |
| 3,968,873 A | * | 7/1976 | Pomeroy et al. | |
| 4,120,401 A | * | 10/1978 | Newman | |
| 4,384,688 A | * | 5/1983 | Smith | 242/378.2 |
| 4,432,120 A | * | 2/1984 | Sherman, Jr. et al. | |
| 4,499,341 A | * | 2/1985 | Boyd | 191/12.4 |
| 4,532,972 A | * | 8/1985 | Sinsko | 150/100 |
| 4,782,967 A | * | 11/1988 | Thomas | |
| 5,011,447 A | * | 4/1991 | Watanabe | 446/220 |
| 5,124,685 A | * | 6/1992 | Rankin | |
| 5,316,249 A | * | 5/1994 | Anderson | |
| 5,358,099 A | * | 10/1994 | Tavone | |
| 5,411,156 A | * | 5/1995 | Reckamp | |
| 5,531,333 A | * | 7/1996 | Vara | 211/26 |
| 5,680,928 A | * | 10/1997 | Carr | |
| 5,685,436 A | * | 11/1997 | Davet | |
| 5,728,415 A | * | 3/1998 | Troska | |
| 5,816,458 A | * | 10/1998 | Yonenoi | 224/182 |
| 5,864,925 A | * | 2/1999 | McGee | 24/3.11 |
| 5,989,093 A | * | 11/1999 | Nelson et al. | 446/220 |
| 6,212,741 B1 | * | 4/2001 | Cahill | |

* cited by examiner

Primary Examiner—James R. Brittain
(74) Attorney, Agent, or Firm—Charmasson, Buchaca & Leach, LLP

(57) ABSTRACT

A tether based connector for locating, identifying, inventorying, controlling and helping to ensure the retrieval of one or more items packaged within a container loaded with potentially obscuring packaging materials. The connector is formed from a stratified body having a die-cut upper sheet layer to form one or more extractable tethers, each of which terminates at a fastener at one end for releasably fastening to an item, and at an easily located terminus at the other end. The terminus may be formed as an anchorment for anchoring to the container. A single anchorment may be adapted to serve a plurality of tethers for fastening to a plurality of items. A badge carrying item identifying information can be associated with a connector.

17 Claims, 5 Drawing Sheets

PACKAGING CONNECTOR

PRIOR APPLICATION

This is a continuation-in-part of application Ser. No. 09/046,112 filed Mar. 20, 1998, now U.S. Pat. No. 6,212,741 which is a continuation-in-part of application Ser. No. 08/536,400 filed Sep. 29, 1995, now abandoned.

FIELD OF THE INVENTION

The instant invention relates to shipping packaging, and more specifically to a packaging accessory and means of manufacturing that allows items shipped or stored in a container along with potentially obscuring padding and insulating material to be easily identified and retrieved from this material and to be maintained in the proper location within this material.

BACKGROUND OF THE INVENTION

Once an item is placed in a container and the container is closed, it is difficult to confirm that the item is indeed in the container, especially in a busy packaging station or where multiple components are shipped or stored. Likewise, once an item is packed it can be difficult to identify the precise item, among many possible items, contained therein. Where multiple components are involved, both the packagers and the recipients may not locate all components: not all components may be included in the container or they may not all be successfully retrieved from the container by the recipient. Employees can make mistakes as can customers. Likewise, employees and customers may fraudulently claim that no item was present in a container when shipped or received.

Mistakes in packaging and shipping or storage are evermore likely with the recent increase in the market for goods shipped via orders placed on the global computer network by smaller companies or individuals, or by larger companies operating under just-in-time inventory management strategies. There are lately more and smaller components and they are being shipped in smaller quantities to more diverse and anonymous buyers. Thus, both the likelihood and expense of fraud or accident has increased. Further, the use of unskilled labor can increase the likelihood of accident, miscommunication and fraud during assembly and packaging. The outsourcing of small-component fabrication or assembly plants across nations and cultures only increases this risk.

Further, the highly competitive nature of the computer network based economy with ever-more consumer choice and savvy, coupled with the commoditization of many previously single-source premium products, has caused companies to seek market differentiators and to improve customer relations. The experience of opening a container from a vendor, the so-called "out-of-box experience," has become a subject of much study among marketers hoping to gain a degree of competitive advantage. An attractive and functional package that is easy to open and provides for quick retrieval of the contents, will deliver a positive experience and tend to enhance a customer's perceptions about a vendor. If properly designed in terms of its ease-of-use and visual presentation, such packaging could also encourage the recipient to follow a pattern or step-by-step approach to opening a container and retrieving an item, which approach may be choreographed by a marketing or engineering department to achieve a desired end.

Packaging is a time-consuming step in the chain of events between ordering and shipping. It would be advantageous to have items packaged swiftly and accurately, and even to have them prepackaged for immediate shipping. Further, once packaged, it would be advantageous to easily inventory items that are warehoused in pre-packed configurations for immediate delivery.

It would also be advantageous for any improved packaging enhancing device to be unobtrusive so as not to disrupt the normal workflow, non-bulky so that it could be pre-applied or incorporated into to the containers, such as to disassembled boxes stacked flat on a pallet.

The use of padding or other packaging material to protect fragile items can also cause the item to be obscured from view. Not only is it difficult to identify the item once covered in this material, it is often impossible to determine whether the item continues to reside in the proper location within this material such that it is protected. Items often drift to the bottom or side of a container during handling or shipping. Thus, it would be advantageous to have a means of quickly confirming that an item exists within the packaging material and to have a means of maintaining the item in the proper location within the obscuring packaging material, both in terms of its depth in the packaging material and its position between the walls of the container.

When several items are packaged together, or when a catalog, document, or promotional item is included in the container, a recipient may assume that the first item they retrieve is the only item in the container; he may discard the other items unknowingly along with the protective, but obscuring, packaging material. If confronted with a mass of light or difficult-to-control packaging material, such as foam peanuts, shredded paper, air bags, or the like, the recipient may be discouraged from diligently searching through the container to confirm that all items have been successfully retrieved. Thus, it would be advantageous to provide a means for readily identifying the location, type, and number of items within a container.

In the case where a customer claims that an item was absent in a container, the vendor is confronted with several options and must choose among the following responses: A. "The item must have been in the container we shipped to you, since we don't make shipping or packaging mistakes," B. "You made a mistake; you probably threw it out." C. "We don't believe you, you are being dishonest," and D. "We are sorry, we will send out a replacement immediately." Clearly, the latter is, while expensive, the most likely response if customer satisfaction is to be ensured.

For these and other reasons, there is an immediate and long-felt need for a packaging device that allows facile identification of items in a container, whether open or closed; which maintains items in their proper location in the container and among protective packaging material; which positively enhances the recipient's experience of opening the container and retrieving the item(s); which dissuades fraud on the part of employees and customers; which allows rapid visual or mechanical/electronic confirmation and inventory of prepackaged items; which can be manufactured and applied inexpensively and quickly; which can guide the process of item retrieval from the container; which is unobtrusive and thin enough to be attached to containers or incorporated into the container for rapid deployment; and which is sufficiently versatile to allow attachment to a variety of containers and items.

SUMMARY OF THE INVENTION

The principle and secondary objects of the invention are to provide a means of locating an item packaged in a container among potentially obscuring protective packaging material.

It is another object of the invention to provide a means of maintaining the proper position of the item within the container.

It is another object of the invention to provide a facile means of determining whether an item has been packaged within a closed container and to inventory or identify that item through visual inspection or optical or electrical scanning.

It is another object of the invention to provide a means of visually directing a person to an item contained within a package or exciting a person to continue in the process of opening a package to retrieve an item, such as a promotional item, contained therein.

It is another object of the invention to provide a means of improving the experience of consumers in retrieving items from shipped containers and to thereby improve customer relations, the prestige of the shipping company, customer loyalty, and brand-name recognition.

It is another object of the invention to provide a means of controlling or guiding the process and order by which a recipient opens a container and retrieves items.

It is another object of the invention to provide a means of making a packaging device that can achieve the goals stated herein without being obtrusive, bulky, or disruptive of the shipping and packaging workflow, and which is easily manufactured and applied to a container and item.

It is another object of the invention to provide a means of discouraging accidents, theft, and fraud on the part of employees involved in packaging and shipping, and on the part of recipients of a package containing items.

These and other objects are achieved by a thin, unobtrusive packaging device composed of layers having a peel-away layer that exposes a glue layer affixed to a slab, the top portion of which has been perforated or otherwise constructed to create a releasable extendible arm or tether that terminates in a pad fastener that can be fastened to a packaged item by glue, bands, or other means. The length of the arm is selected so that the item is held in proper position amid potentially obscuring packaging materials and such that it is easily identifiable both by visual inspection of the arm tethered to the packaged item and by visually matching a label on the slab with the name or number of the packaged item. An additional arm allows suspension of the item at a desired distance between two walls of the shipping container. Corresponding labels and graphics may contain attractive logos, advertisements, or instructions, and a portion of the slab containing these may extend to the outside of the container to allow easy visual or mechanical identification of the packaged item when the container is closed.

DESCRIPTION OF THE PREFERRED EMBODIMENT OF THE INVENTION

Allowed U.S. patent application Ser. No. 09/046,112 issuing as U.S. Pat. No. 6,212,741 is fully incorporated herein by this reference.

Figure 1:
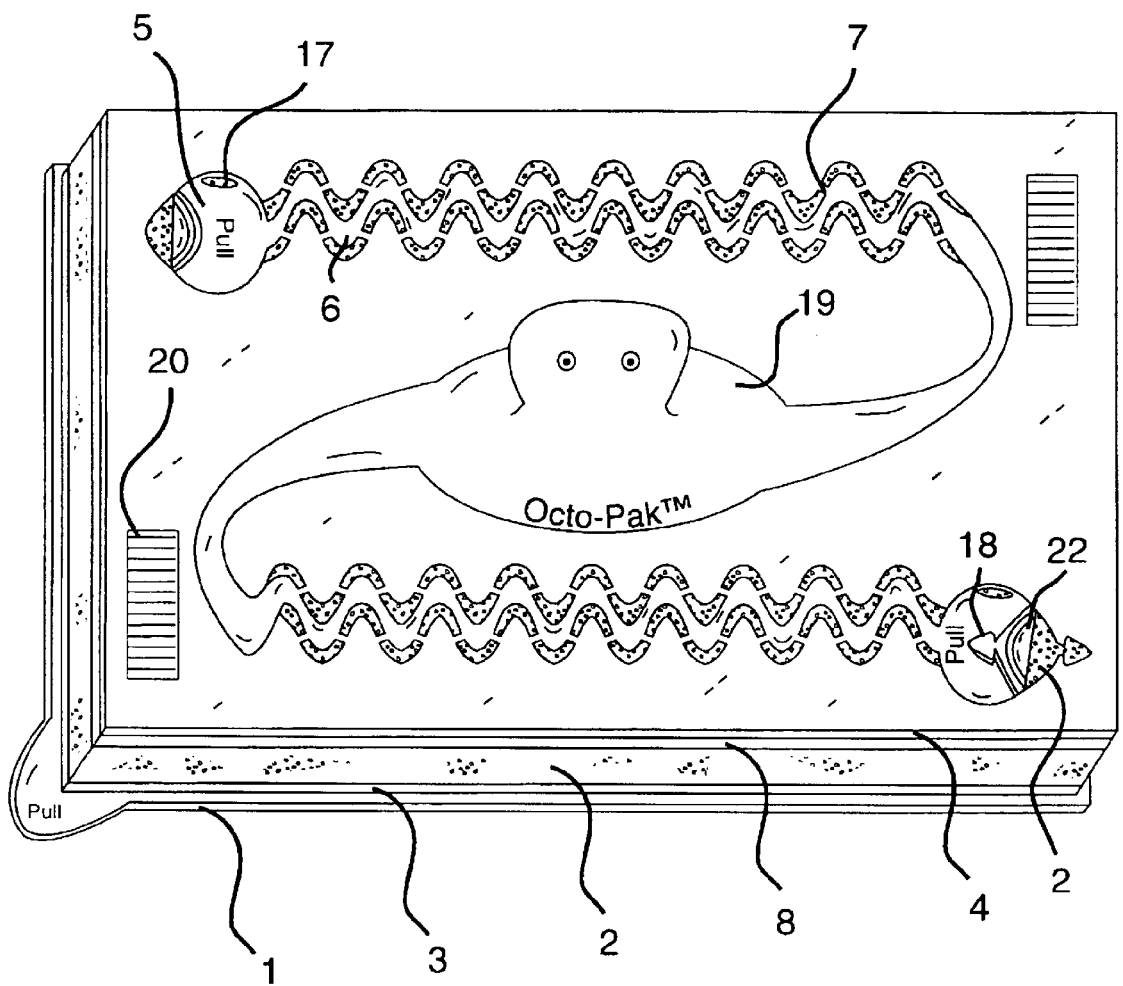
FIG. 1 1 shows a packaging device according to the invention having two tether-arms and barcodes.

Referring now to the drawing, there is shown in FIG. 1, a first embodiment of a packaged item locationg connector device according to the invention having a generally stratified body, a peel-away film 1 that, when peeled away reveals a slab 2 having a first bottom adhesive glue layer 3 that allows it to be affixed to the inside of a container such as an envelope or cardboard box. The upper surface of the slab is covered by a top layer 4 of flexible sheet material atop a second adhesive layer 8. The top layer has been dye cut to create a releasable fastener or item pad 5 and an elongated flexible tether-arm 6 which, when extracted or pulled free of the dispensing slab releases in a step-wise fashion along successive breakable attachment-bridges 7 separated by perforations, or by simply releasing from the underlying adhesive layer 8 without the need for bridges. The item-pad is then affixed, via a dollop of adhesive 22 cut from the underlying adhesive layer 8 or other means, to an item to be shipped.

The perforations are shaped to provide a tether having resiliency-enhancing undulations providing a tether of greater selectable length and providing a shock-dampening springiness quality to the tether.

The top layer 4 of the slab 2 is preferably composed of a strong material having a thickness that is preferably no greater than 5 mm which is capable of holding the weight of an average shipping item. In cases where a stronger tether-arm 6 is required, the material of the top-layer 4, or tether-arm 6 alone, may be made thicker or may incorporate a strong strand of fiber, such as nylon, hemp, or Kevlar brand material, which is suitably anchored to the slab 2 such as by a strong glue or staple. The top-layer 4 is preferably composed of an elastomeric compound such as silicone, which would allow for additional lengthening beyond that provided by the unstretched length of the tether-arm 6. This would also contribute to the absorption of shock that may occur during shipping, which may otherwise allow the item to release from or break the item-pad 5 or tether-arm 6.

The item-pad 5 preferably comprises several means of attaching to a variety of items, including that provided by a glue attached to the underside of the pad either as a part of the second glue layer 8 or as a localized dollop, extendable affixer loops 17 or bands, and affixer projections 18 or barbs that may be inserted into the item. In the case of a glue, the glue is preferably applied only under the item-pad 5 and anchor-pad 6.

Figure 2:
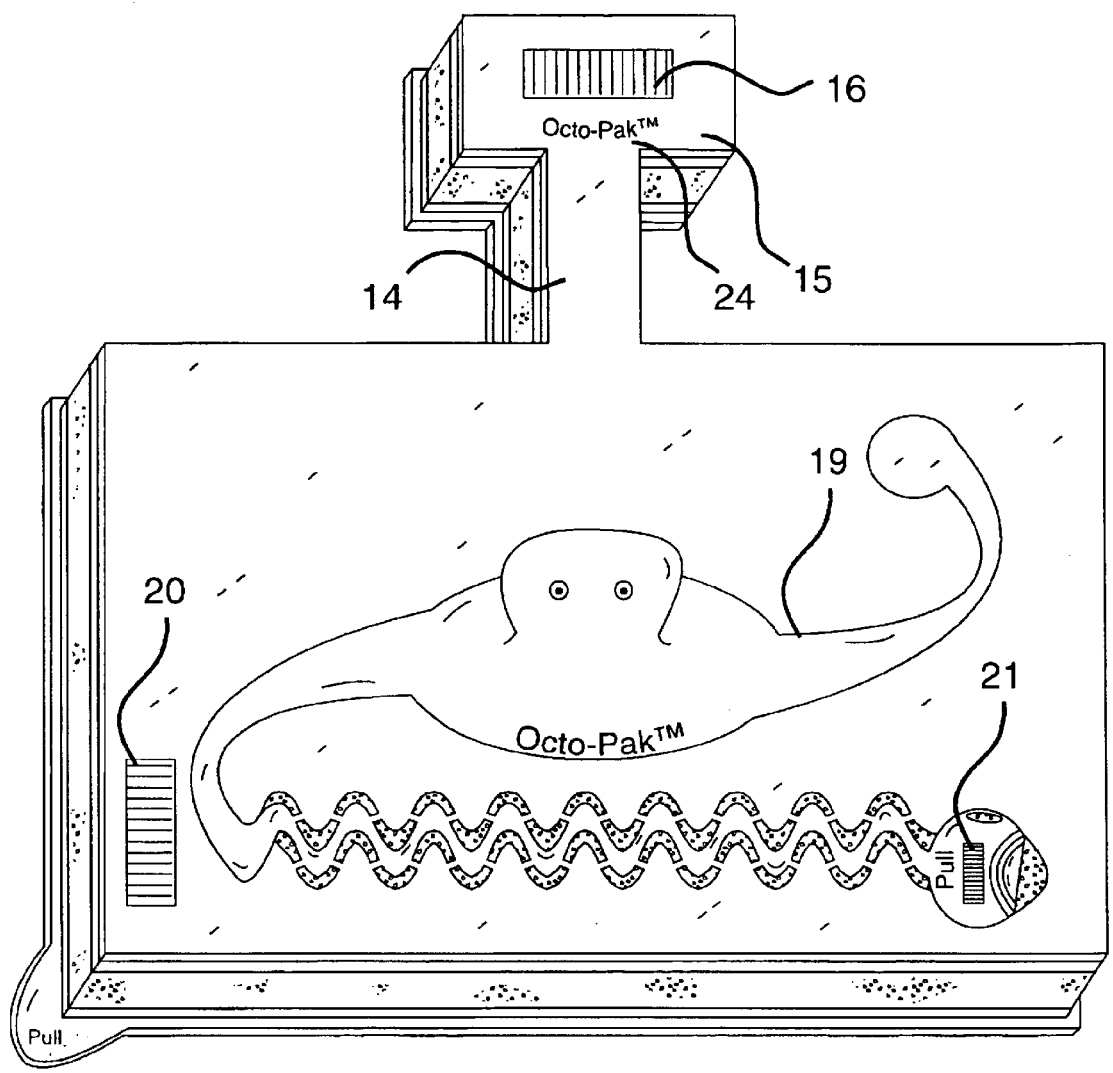
FIG. 2 shows a packaging device according to the invention having one tether-arm and a barcode on the item-pad which corresponds to that on the top-layer of the slab. A flap-tab containing a barcode and graphic is also shown.

In an alternate embodiment shown in FIG. 2, the slab 2 and its layers contain a projection having a tab-neck 14 and a flap-tab 15 which may contain a flap-graphic 24 such as a barcode that aids in identifying this packaging device or the packaged item 23 within the container when the tab-neck 14 is folded over the edge of an opening to the container and the flap-tab 15 is affixed to and visible from the outside of the container when it is closed.

In the case of fraud, such as claiming falsely that an item was packaged or not, as by an employee or customer, a device that directly linked, and evidence that, the item was attached to the container would be an additional factor discouraging such claims even when used with every item shipped, the cost of the device would be less than the cost of fraud on the part of employees and customers.

The slab 2 preferably contains a projection comprising a tab-neck 14, and flap-tab 15 that resides on the outside of the package and provides a means of visually or mechanically confirming that the item is contained within the closed container and is anchored by some means. Preferably this flap-tab 15 contains a badge for containing a graphic or an item-identifier 16, such as a barcode for optical scanning or an electrical device, to identify the item contained in the container. This means may include graphics such as instructions, promotional communications, or a barcode corresponding to or identifying the item contained and attached within.

The connector of the invention can be efficiently manufactured, a first bottom adhesive layer 3 is applied to the underside of an oblong slab 2 and is covered by a peel-away film 1. A second top adhesive layer 8 is applied to the top side of the slab and is covered by a top layer 4, preferably elastomeric, which has been dye cut to form bond-weakening punch out sections or apertures thereby leaving breakable bridges 7, and integrally forming one or more releasable tether-arms 6 and item-pads 5. The top-layer 4 contains a logo graphic 19 depicting an octopus with tentacles coiled; it also contains a top-layer barcode 20 which is unique to each tentacle that is capable of forming a tether-arm 6. Each item-pad 5 may also contain a corresponding pad-barcode 21. The underside of the item-pad 5 contains glue that is a part of the second glue layer 8, or contains a localized glue dollop 22 applied only in the area directly under the item-pad 5 or anchor-pad 10, thereby leaving the underside of the tether-arm 6 dry and unfouling after it is pulled away from the slab 2. Each item-pad 5 contains at least one means of affixing itself to a packaged item 23, which means, in addition to a localized glue dollop 22, may include an affixer-loop 17 which in an elastomeric material can be pulled over the packaged item 23 or over a projection on the item in the manner of a rubber band, or it may be an affixer-projection 18 such as a barb that can be inserted into a hole on the item or inserted into a hole in itself or in the pad in the manner of a zip-tie or the like.

Figure 3:
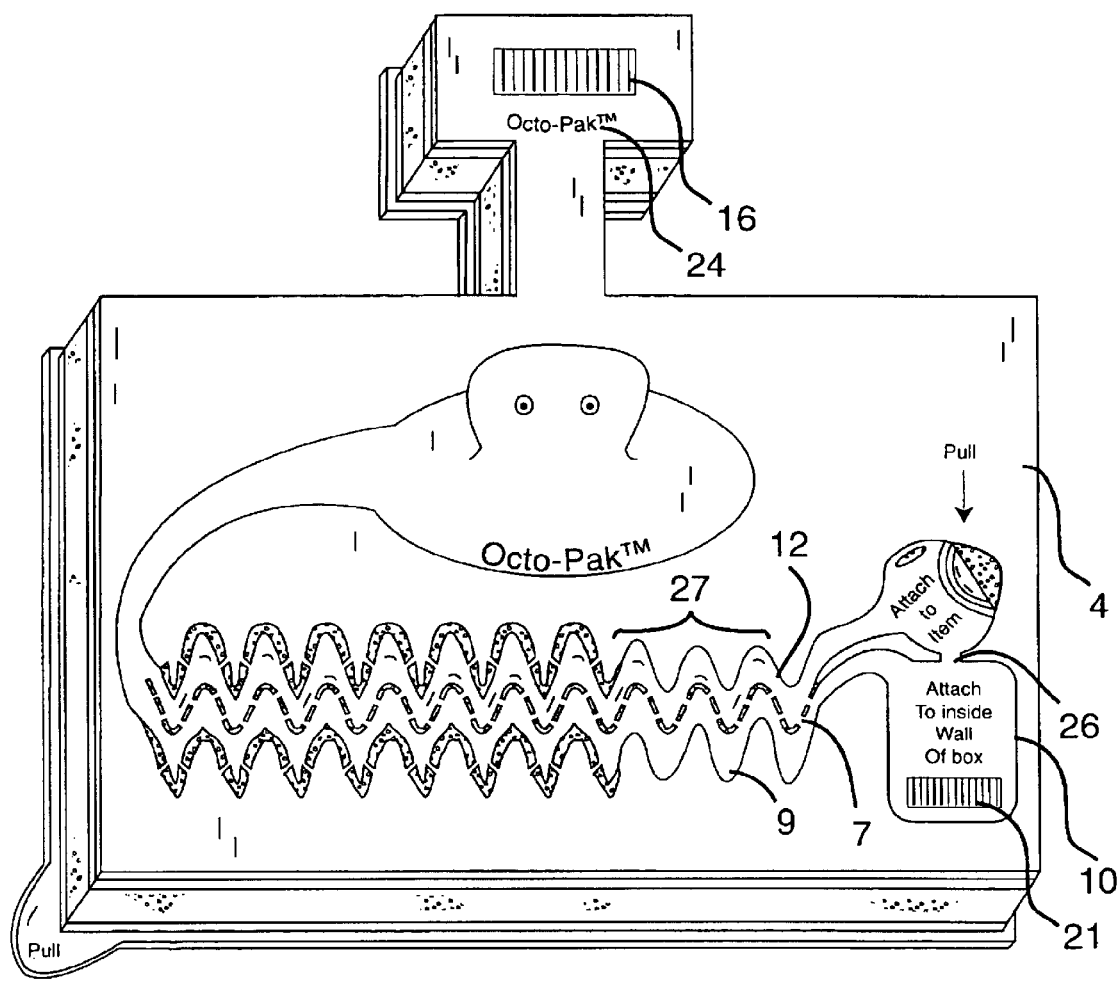
FIG. 3 shows a packaging device having a tether-arm that is separable into two sub-arms: one terminating in an item-pad, the other terminating in an anchor-pad.
Figure 4:
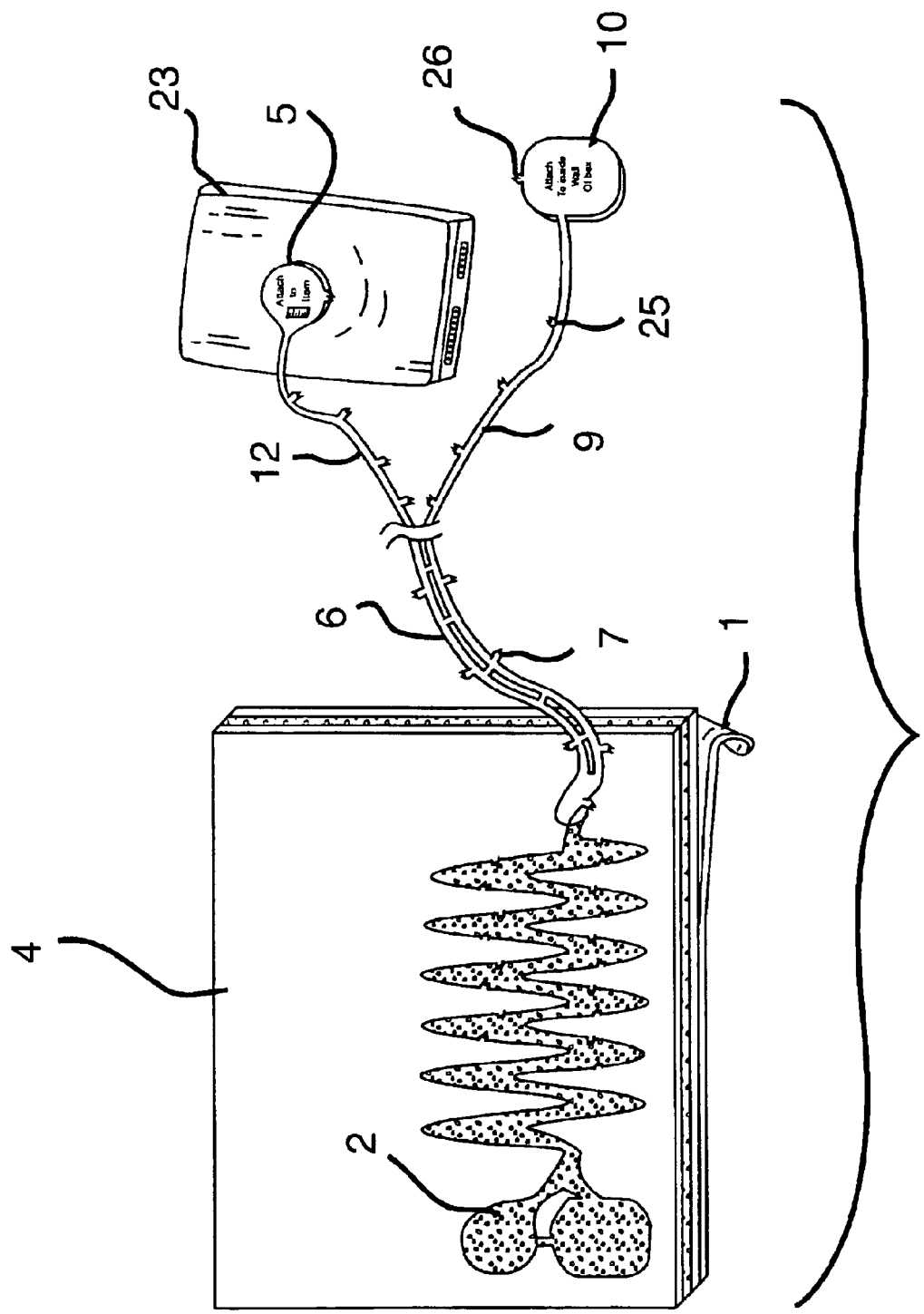
FIG. 4 shows a packaging device in which the tether-arm has been peeled back from the slab and then separated into two sub-arms: one terminating in an item-pad affixed to an item, the other terminating in an anchor-pad which will be affixed to the container wall opposite that to which the slab is affixed.
Figure 5:
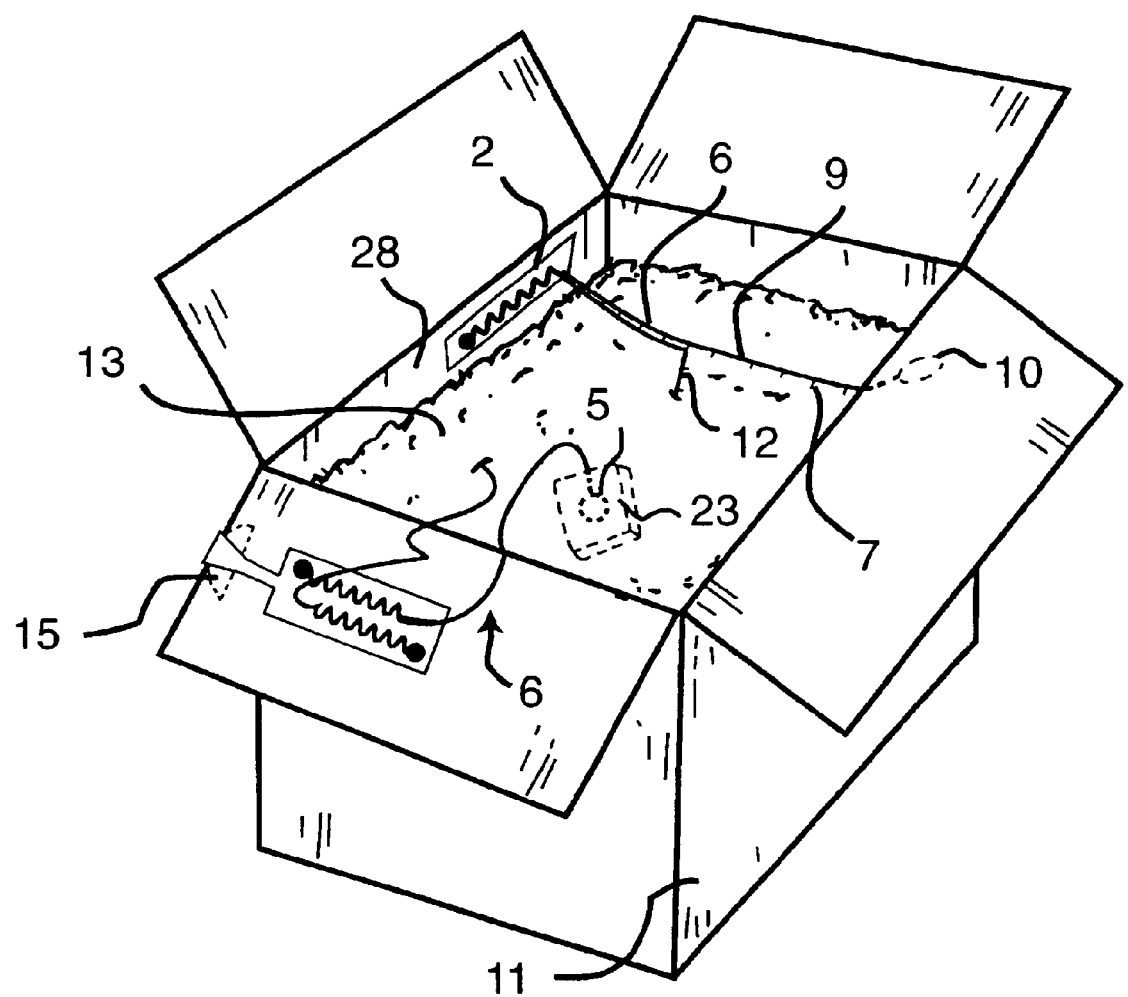
FIG. 5 shows a container filled with protective packaging material and containing items tethered by various configurations of the packaging device.

In an alternate embodiment as shown in FIGS. 3–5, at least one tether-arm 6 that is perforated to create breakable arm-bridges 25 that can be separated along its longitudinal axis to create two sub-tethers or sub-arms: one of which forms an anchor-arm 9 terminating in an anchor-pad 10 to be affixed to the container wall 11, the other which forms an item-arm 12 terminating in an item-pad 5 affixed to the packaged item 23. The anchor-pad 10 and item-pad 5 are separable by breaking a conjoining pad-bridge 26. The anchor-pad 10 and item-pad 5 may each contain a pad-barcode 21, instructions, or other graphics. The proximal portion of the tether arm 27 may not contain arm-bridges 7, in order to facilitate removal of this first portion from the slab 2, and to anticipate a minimum length required for release of the tether-arm 6 given an average box of known depth. Once removed, the tether-arm 6 can be separated by breaking a section of arm-bridges 25 along its longitudinal axis so that the anchor-arm 9 extends across the container and the anchor-pad 10 is affixed to the container wall 11 opposite the slab-wall 28 to which the slab 2 is affixed. The tether-arm 6, which terminates in the item-pad 5, is thereby able to fall into the packing material 13 of the container and maintains the packaged item 23 at a controlled distance between the walls and at a controlled depth in the packaging material 13. The proximal portion of the tether-arm 27 that does not contain perforations, arm-bridges 7, or other means of facile separation from the slab may be wider or otherwise made strong so that it does not break or otherwise unduly increase the length of the tether-arm by allowing continued release of the top-layer 4 from the slab 2, and thereby functions to control the maximum length of the tether-arm.

While the preferred embodiments of the invention have been described, modifications can be made and other embodiments may be devised without departing from the spirit of the invention and the scope of the appended claims.

What is claimed is:

1. A device for locating an item packaged in a container among potentially obscuring protective material, said device comprises:
   an elongated flexible tether extractably loaded upon a dispenser anchorable to said container;
   wherein said tether comprises a first end connected to a fastener attachable to said item;
   wherein said dispenser comprises a stratified body having a bottom adhesive layer and a top layer.

2. The device of claim 1, wherein said tether is formed integrally with said top layer.

3. The device of claim 2, wherein said tether further comprises a plurality of undulations thereby forming a resiliency enhancing structure.

4. The device of claim 2, wherein said top layer is formed from a single piece of flexible sheet material.

5. The device of claim 4, wherein said flexible sheet material is selected from the group consisting of an elastomeric, vinyl, or latex rubber.

6. The device of claim 1 which further comprises said top layer being shaped to form a weakened bond between said tether and a remainder portion of said top layer.

7. The device of claim 6, wherein said weakened bond comprises an aperture separating a portion of said tether from said remainder portion.

8. The device of claim 1, wherein said fastener is selected from the group consisting of: a piece of sticky tape; an amount of glue; a rivet; a staple; complementary magnetic strips; complementary hook-and-vane fasteners; twist tie materials; a clip; and a sealable bag.

9. The device of claim 1, wherein said dispenser further comprises a badge adapted to carry item identification information.

10. The device of claim 1, wherein said tether is separable into one or more subtethers.

11. A device for locating an item packaged in a container among potentially obscuring protective material, said device comprises:
   an elongated flexible tether extractably loaded upon a dispenser anchorable to said container;
   wherein said tether comprises a first end connected to a fastener attachable to said item;
   wherein said tether and said fastener are formed integrally from a layer of elastomeric material; and
   wherein said fastener comprises a widened portion of said tether into a sheet-like pad.

12. The device of claim 11, wherein said pad is shaped to form an attachment eye through said pad.

13. The device of claim 11, wherein said device further comprises an adhesive disk formed on a first surface of said pad.

14. A device for locating an item packaged in a container among potentially obscuring protective material, said device comprises:
   an elongated flexible tether extractably loaded upon a dispenser anchorable to said container;
   wherein said tether separates into one or more subtethers connected to said dispenser; and, wherein said dispenser comprises a stratified body having a bottom layer and a top layer.

15. The device of claim 14, wherein said tether is formed integrally with said top layer.

16. The device of claim 15, wherein said tether further comprises a plurality of undulations thereby forming a resiliency enhancing structure.

17. The device of claim 14, which further comprises said top layer being shaped to form a weakened bond between said tether and a remainder portion of said top layer.

* * * * *